March 11, 1969  H. S. BOTTOMS  3,431,862

GEAR PUMPS

Filed Aug. 24, 1966

United States Patent Office 3,431,862
Patented Mar. 11, 1969

3,431,862
GEAR PUMPS
Harry Simister Bottoms, Solihull, England, assignor to Joseph Lucas (Industries) Limited, Birmingham, England, a British company
Filed Aug. 24, 1966, Ser. No. 574,822
U.S. Cl. 103—126    3 Claims
Int. Cl. F04 1/04

ABSTRACT OF THE DISCLOSURE

A gear pump having an inlet and an outlet at opposite sides respectively of the position at which the two gears mesh and in which at least one of the gears has holes in each of its teeth, the hole in each tooth extending from the end face of that tooth to the trailing face thereof.

---

This invention relates to gear pumps and has for its object to provide such a pump in a convenient form.

In accordance with the present invention, a gear pump having an inlet adjacent to the point at which the gears mesh and disposed at the ends of the meshing gears is characterised in that the teeth of at least one of the gears have respective bores, each such bore extending from the end face of a tooth to the trailing face thereof.

Figure 1:
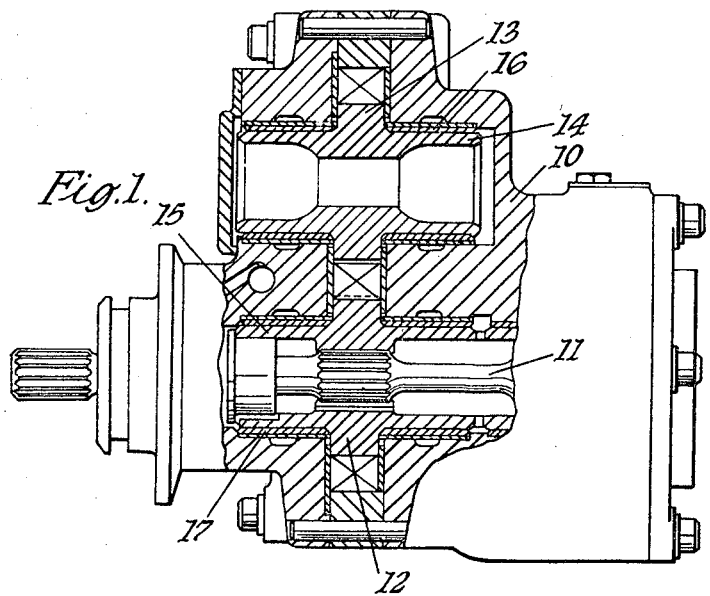
Figure 3:
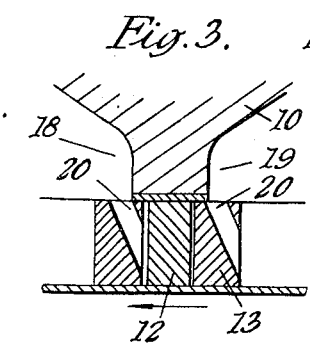
Figure 2:
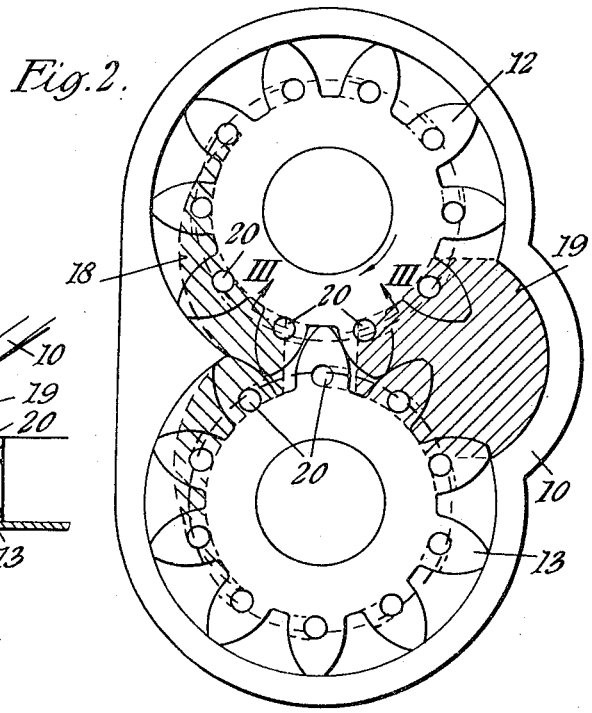

The invention will now be described by way of example with reference to the accompanying drawings in which:

FIGURE 1 is a cross-section side elevation view of a gear pump incorporating the invention, FIGURE 2 is a generally diagrammatic view with one end face of the body removed to reveal the internal layout of the gears of the pump, and FIGURE 3 is a cross-sectional view on the line III—III in FIGURE 2.

The pump illustrated in FIGURE 1 is particularly suitable for relatively high speed operation and comprises a body 10 through which extends a shaft 11 arranged to drive a gear 12, which drives a second gear 13 mounted on a hollow shaft 14, the shaft 14 and a similar hollow shaft 15 for the gear 12 being mounted in suitable bearings 16, 17 in the body 10. As illustrated in FIGURE 2 the gears 12, 13 are of equal size and on one side of the point of meshing is an inlet port in an end face of the body 10, the shape of this inlet port being indicated by the shaded area 18 in FIGURE 2. This shape of inlet port is claimed in the complete specification of United States application No. 390,029, now Patent No. 3,276,387, though it will be appreciated that inlet ports of more conventional shape may be used.

On the opposite side of the point at which the gears mesh there is an outlet port also formed in the end face of the body 10, the shape of this outlet port being indicated by the shaded area 19 in FIGURE 2. Such inlet and outlet ports may be provided at both ends of the gears 12, 13.

The teeth of the gears 12, 13 are of conventional involute form and in one or both ends of the gears or one of them, there are a plurality of holes 20 each tooth having such a hole. These holes 20 terminate respectively at the trailing edge of the teeth and such termination is adjacent to the root of the tooth as seen in FIGURE 2. The termination of the holes is also mid-way between the opposite ends of the gears, as seen in FIGURE 3.

The arrangement is such that, as the pump operates, the holes 22 communicate with the inlet port 18 before the space between the separating teeth on the respective gears communicates therewith. The holes 20 therefore permit entry of liquid to a space which is about to communicate with the inlet port thus tending to assist filling of the spaces between the teeth and minimising any tendency towards cavitation, which is the formation of vapour pockets in the liquid being pumped, due to formation of low pressure regions.

It will be appreciated that the holes 20 may terminate at respective positions other than at the roots of the teeth, though the effective filling will thus be retarded. Furthermore, in the construction shown, the holes 20 are disposed on or near a circle passing through the roots of the teeth of the gears respectively, and this position can also be varied to produce a similar effect.

Having thus described my invention what I claim as new and desire to secure by Letters Patent is:

1. A gear pump comprising a body, a pair of meshing gears within a cavity in the body, the body having an inlet and an outlet disposed in the side of the cavity with which the side faces of the gears engage, said inlet and outlet being disposed at opposite sides respectively of the position at which the gears mesh, each gear having teeth defining leading and trailing faces respectively, each of the teeth of at least one of the gears having a drilling extending from the end face to the trailing face of the tooth.

2. A gear pump as claimed in claim 1 in which each drilling extends from near the tooth root at the end of the gear, to the mid-region with respect to the axial depth of the gear, of the flank of said tooth.

3. A gear pump as claimed in claim 1 in which both gears have drillings in all their teeth.

References Cited

UNITED STATES PATENTS 1,728,528   9/1929   Butler _____ 103—126
3,075,470   1/1963   Wood _____ 103—126

DONLEY J. STOCKING, Primary Examiner.

LEONARD H. GERIN, Assistant Examiner.